United States Patent
Belz et al.

(10) Patent No.: US 8,782,694 B2
(45) Date of Patent: Jul. 15, 2014

(54) SYSTEMS AND METHODS FOR DETERMINING USER OUTPUT PREFERENCES

(75) Inventors: Steven M. Belz, Cedar Park, TX (US); Marc A. Sullivan, Austin, TX (US); James Pratt, Round Rock, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 608 days.

(21) Appl. No.: 12/120,367

(22) Filed: May 14, 2008

(65) Prior Publication Data
US 2009/0288115 A1 Nov. 19, 2009

(51) Int. Cl.
*G06F 3/00* (2006.01)
(52) U.S. Cl.
USPC .......................................................... 725/37
(58) Field of Classification Search
None
See application file for complete search history.

(56) References Cited

U.S. PATENT DOCUMENTS

| | | | |
|---|---|---|---|
| 5,977,964 A * | 11/1999 | Williams et al. | 715/721 |
| 6,618,045 B1 * | 9/2003 | Lin | 345/207 |
| 7,093,272 B1 * | 8/2006 | Shah-Nazaroff et al. | 725/39 |
| 7,448,063 B2 * | 11/2008 | Freeman et al. | 725/136 |
| 2003/0063222 A1 * | 4/2003 | Creed et al. | 348/687 |
| 2006/0023794 A1 * | 2/2006 | Wan et al. | 375/240.29 |
| 2007/0156589 A1 | 7/2007 | Zimler et al. | |
| 2007/0180489 A1 | 8/2007 | Joseph et al. | |
| 2007/0220582 A1 * | 9/2007 | Hallberg et al. | 725/135 |
| 2007/0294737 A1 | 12/2007 | Edwards et al. | |
| 2008/0092181 A1 * | 4/2008 | Britt | 725/87 |
| 2008/0184304 A1 * | 7/2008 | Ellis et al. | 725/40 |
| 2011/0179435 A1 * | 7/2011 | Cordray et al. | 725/9 |

* cited by examiner

*Primary Examiner* — Rong Le
(74) *Attorney, Agent, or Firm* — Guntin & Gust, PLC; Douglas Schnabel

(57) ABSTRACT

A method is disclosed for determining audiovisual output preference. The method comprises providing first and second stimuli having respective sets of audio and visual characteristics. The method receives a user selection between the first and second stimuli, and includes the set of audio and visual characteristics corresponding to the selected stimuli in the audiovisual output preference.

14 Claims, 5 Drawing Sheets

SYSTEMS AND METHODS FOR DETERMINING USER OUTPUT PREFERENCES

FIELD OF THE DISCLOSURE

The present disclosure generally relates to communications networks, and more particularly relates to systems and methods for determining user output preferences.

BACKGROUND

Audio/video systems can include a number of settings to adjust the viewing experience. Televisions typically can have settings like contrast, brightness, color, sharpness, and color temperature to adjust the display qualities. Similarly, sound equipment can include a multi-band equalizer for adjusting the sound output to compensate for the room acoustics, and can include settings to adjust delays between speakers to compensate for speaker placement. However, the interaction between individual settings may not be well understood by the general population. Additionally, characteristics of an audio/video signal can alter the viewing experience. These characteristics, such as compression, chromo subsampling, and the number of audio channels are beyond the control of the consumer and can differ depending on the source of the signal.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
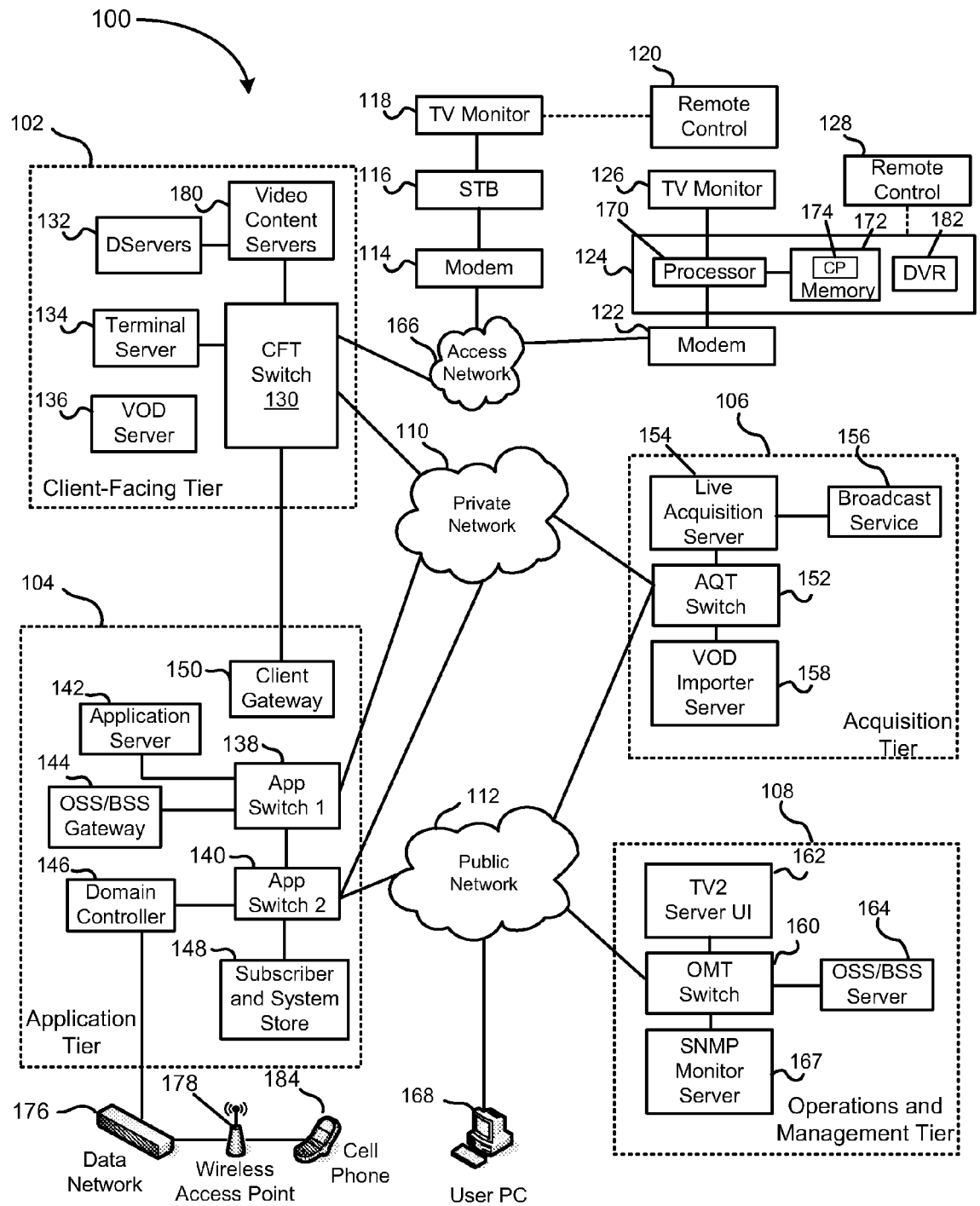
FIG. 1 is a block diagram illustrating an Internet Protocol Television (IPTV) network in accordance with one embodiment of the present disclosure.

FIG. 1 shows an Internet Protocol Television (IPTV) system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an IPTV network. In an illustrative embodiment, modems such as a first modem 114 and a second modem 122 can be coupled to the private access network 166. The client-facing tier 102 can communicate with a first representative set-top box (STB) device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
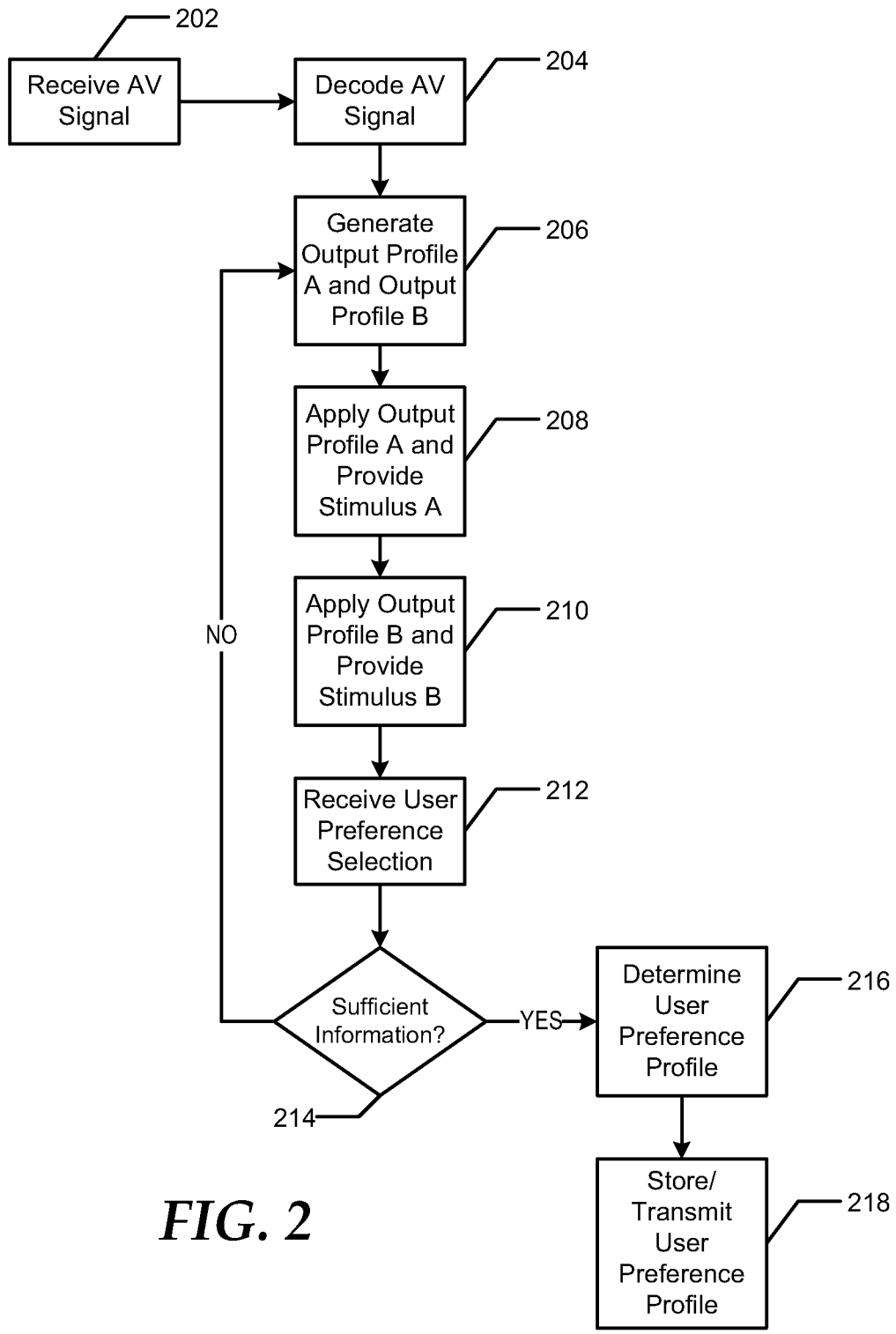
FIG. 2 is a flow diagram illustrating a method of using comparative stimuli to determining a user output preference.

FIG. 2 is a flow diagram illustrating a method of determining a user output preference that can be used in conjunction with network 100. At 202, a signal can be received. The signal can be a compressed digital data stream and can include audio data, video data, or any combination thereof. The signal can be encoded using various codecs including MPEG-2, MPEG-4 AVC (H.264), and other appropriate codecs. At 204, the signal can be decoded to recover the audio and video sequences. At 206, two output profiles, Output Profile A and Output Profile B, can be generated. Output Profile A and Output Profile B can differ in various output characteristics. For video data the output characteristics can include contrast, brightness, color, tint, sharpness, color temperature, hue, saturation, RGB levels, model overlay preference, and the like. For audio data, the output characteristics can include treble, mid-tone, and bass levels, number of channels, delays between channels, surround settings, and the like. Additionally, audio output characteristics can include preset audio effects, such as effects to simulate a concert hall. Changing the output characteristics can change the user experience. For example, Output Profile A may produce a dark picture with high contrast and Output Profile B may produce a bright picture with low contrast. In another example, Output Profile A may cut high frequency sounds and boost low frequency sounds and Output Profile B may boost high frequency sounds and cut low frequency sounds.

At 208, Output Profile A can be applied to components of the audio or video sequence to provide a Stimulus A to the user. At 210, Output Profile B can be applied to components of the decoded signal to provide a Stimulus B to the user. Preferably, Stimulus A and Stimulus B include the same audio or video sequence such that a comparison can be made based on differences in the output characteristics of each of the stimuli. In an embodiment, Stimulus A and Stimulus B can be provided sequentially, such as by providing several seconds of Stimulus A followed by several seconds of Stimulus B. Alternatively, Stimulus A and Stimulus B may be provided simultaneously, such as by dividing displaying Stimulus A in a portion of a display space while displaying Stimulus B in another portion of the display space.

At 212, the user can indicate a preferred stimulus, such as by selecting Stimulus A or Stimulus B from a user interface. The preferred stimulus can be the stimulus most appealing to the user. At 214, when there is not enough information to determine a User Preference Profile, additional comparative stimuli can be generated at 206. Successive rounds of comparative stimuli can be used to search an output characteristic space. For example, subsequent sets of comparative stimuli can be generated close to the preferred stimuli identified in previous rounds.

Alternatively, when a sufficient number of user choices have been registered, the information regarding the user's choices can be analyzed to determine a User Preference Profile, as illustrated at 216. The User Preference Profile can include output characteristics to compensate for variations in the viewing environment. For example, equalizer settings and channel delays may be applied to compensate for discrepancies in the room's acoustics and placement of speakers. In another example, changes in the contrast and brightness may be applied to compensate for the effects of ambient lighting or characteristics of a display device. Additionally, the User Preference Profile can include output characteristics to accommodate a user preference. For example, a user may prefer a deep bass sound or a lighter image. At 218, the User Preference Profile can be stored locally and/or transmitted to a network server for storage. A local copy of the User Preference Profile can be applied by an STB, such as STB 124, to modify incoming audio/video streams. Additionally, a copy of the User Preference Profile stored at a network server, such as video content server 180 or VOD server 136, can be used to modify characteristics of the audio/video stream in accordance with the user preference.

In an embodiment, a series of comparative stimuli can be provided and the user can be prompted to provide a preference score for each stimuli. The scores and the output characteristics can be analyzed, such as by multivariate analysis, to determine the User Preference Profile. Additional stimuli can be provide until the results of the multivariate analysis converge sufficiently.

In another embodiment, the User Preference Profile can include output characteristics for different types of content. For example, output characteristics for sporting events may be different than output characteristics for movies. Additionally, User Preference Profiles can be specific to an STB or to a user. Alternatively, a general set of output characteristics included in a User Preference Profile can be applied to all content, users, or STBs when a specific set of output characteristics has not been determined.

In yet another embodiment, multiple signals encoding the same audio or video sequence can be used. Each signal can utilize different stream characteristics, such as compression, chroma subsampling, quantization, and number of audio channels. Varying the stream characteristics can be used to determine when a viewer prefers increasing the video compression to decrease audio compression or to provide more audio channels. Each signal can be decoded to provide a separate stimulus. Alternatively, multiple output profiles can be applied to each decoded signal to determine a preferred combination of output characteristics and signal characteristics. The preferred combination of output and signal characteristics can be incorporated into the User Preference Profile.

Figure 3:
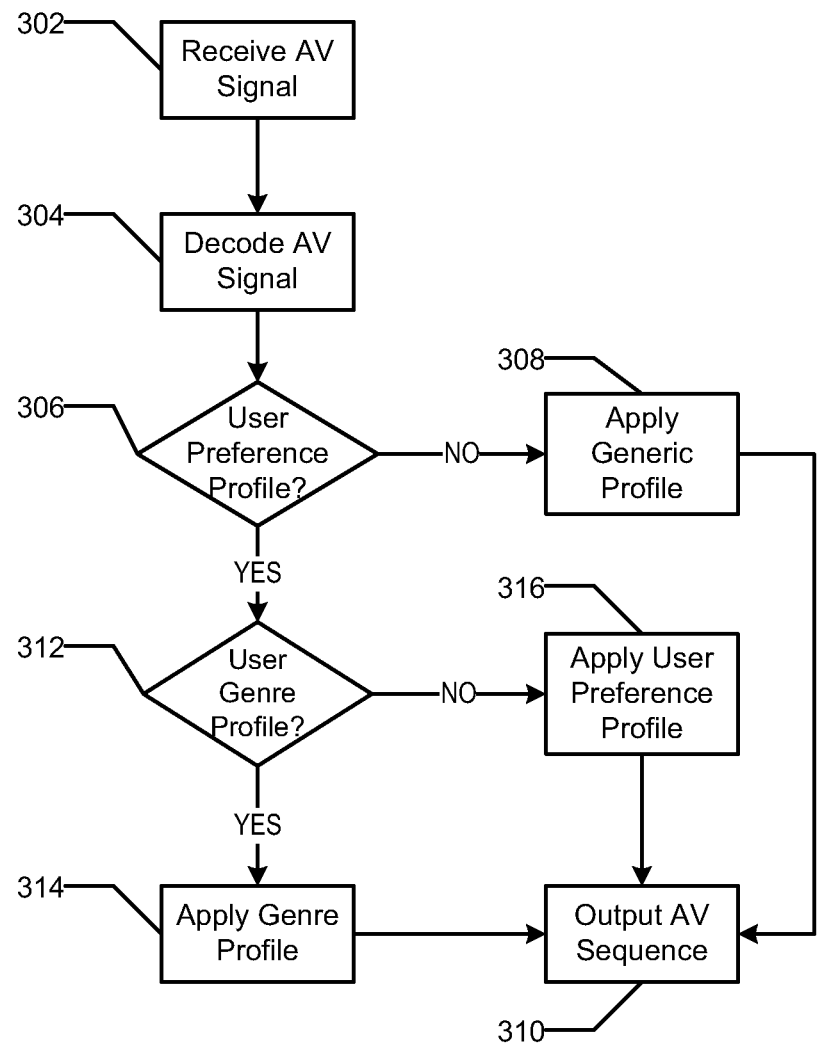
FIGS. 3 and 4 are flow diagrams illustrating exemplary methods of applying a user output preference to an audio/video signal.

FIG. 3 is a flow diagram illustrating an exemplary method of applying a preference profile to an audio or video sequence. At 302, an STB, such as STB 124, can receive a signal. The signal can be a digital signal composed of audio and/or video components. At 304, the signal can be decoded to obtain the audio/video sequence. At 306, when a User Preference Profile is not available, a generic profile included a generic set of output characteristics can be applied to the video at 308. The resulting generic audio/video output can be displayed for viewing, as illustrated at 310.

Alternatively, returning to 306, when a User Preference Profile is available, the STB can determine if the User Preference Profile includes a genre specific preference for the programming content, as illustrated at 312. When a genre specific preference is not available, a set of general output characteristics from the User Preference Profile can be applied to the audio/video sequence, as illustrated at 314. The resulting audio/video output can be displayed for viewing, as illustrated at 310.

Alternatively, returning to 312, when a genre specific preference for the programming is available as part of the User Preference Profile, a set of genre specific output characteristics can be applied to the video, as illustrated at 316. The resulting audio/video output can be displayed for viewing, as illustrated at 310.

Figure 4:
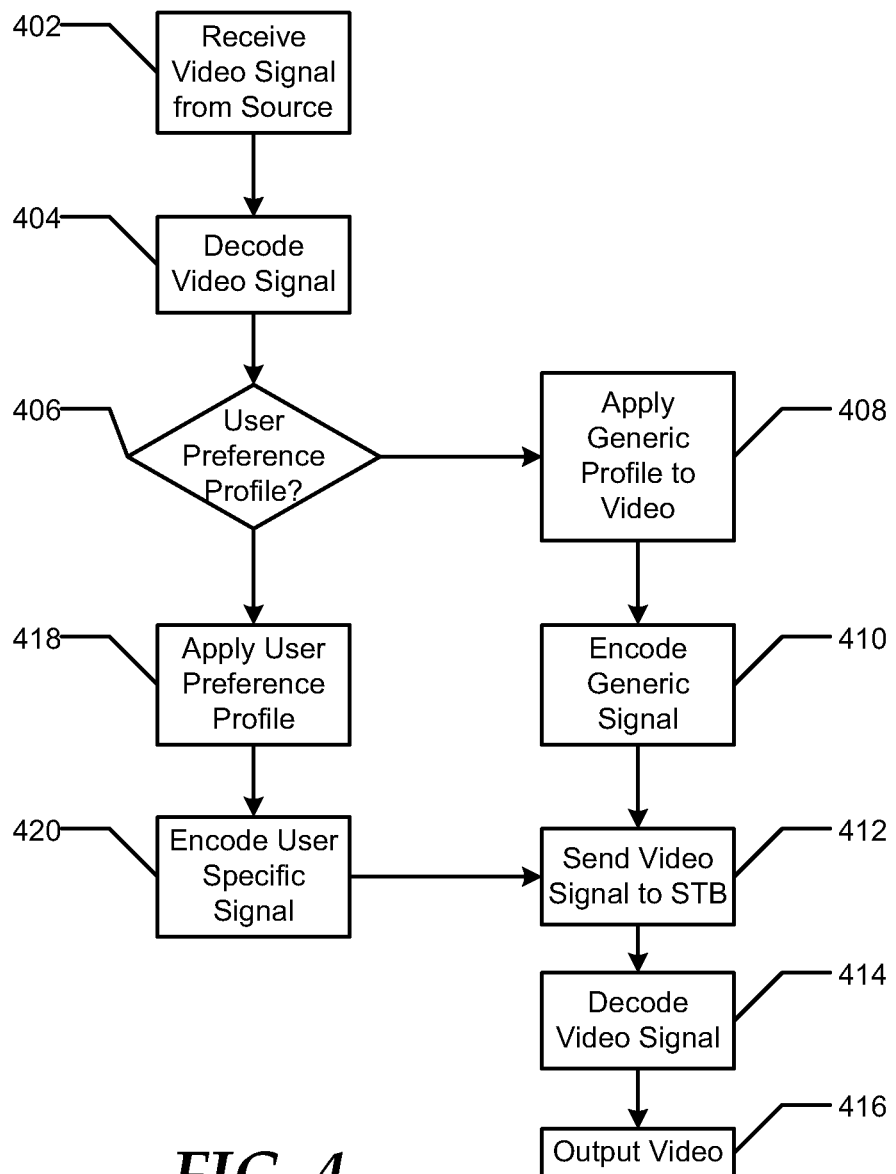

FIG. 4 is a flow diagram illustrating an exemplary method of applying a preference profile to an audio or video signal. At 402 a server, such as video content server 180 or VOD Server 136, can receive a signal from a source, such as Broadcast Service 156 or a VOD Importer Server 158. The signal can be a digital signal composed of audio and/or video components. At 404, the signal can be decoded to obtain the audio/video sequence. At 406, when no User Preference Profile is available, a generic profile including a generic set of output characteristics can be applied to the audio/video sequence at 408. The resulting generic audio and/or video can be encoded into a generic signal using generic stream characteristics, as illustrated at 410. The generic signal can be sent to an STB, such as STB 124, as illustrated at 412. At 414, the STB can decode the generic audio/video signal and the resulting output can be displayed for viewing at 416.

Alternatively, returning to 406, when a User Preference Profile is available, the output characteristics of the User Preference Profile can be applied to the audio/video sequence at 418. The resulting user specific audio and/or video can be encoded into a user specific signal using stream characteristics included in the User Preference Profile, as illustrated at 420. The user specific signal can be sent to an STB, as illustrated at 412. At 414, the STB can decode the audio/video signal and the resulting output can be displayed for viewing at 416.

Figure 5:
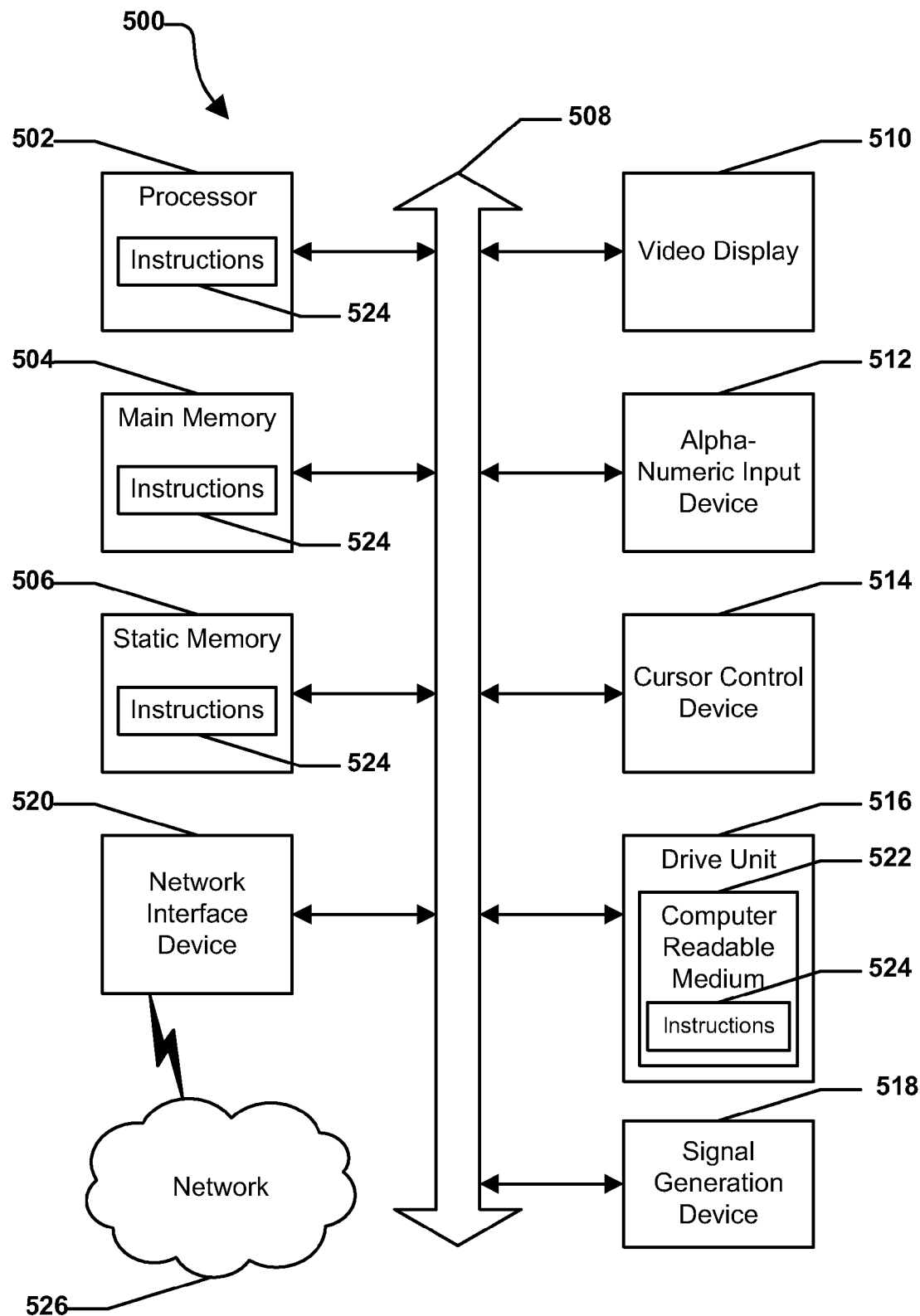
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid state display, or a cathode ray tube (CRT). Additionally, the computer system 500 may include an input device 512 such as a keyboard, and a cursor control device 514 such as a mouse. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
receiving, by a system comprising a processor, a first version of video data and audio data representing media content and a second version of the video data and the audio data representing the media content, wherein the first version is compressed according to a first video compression, wherein the second version is compressed to a second video compression, wherein the first video compression differs from the second video compression, and wherein the media content comprises a first genre;
applying, by the system, a first output profile to the first version of the video data and the audio data at a presentation component during a first reproduction of the media content at the presentation component to generate a first user experience of the media content;
applying, by the system, a second output profile to the version of the video data and the audio data at the presentation component during a second reproduction of the media content at the presentation component to generate a second user experience of the media content, wherein the first user experience and the second experience are simultaneously presented on a first portion and a second portion of a display device;
receiving, by the system, a first preference score of the first user experience and a second preference score of the second user experience;
performing multivariate analysis of the first preference score and the second preference score;
identifying, by the system, a preferred output profile between the first output profile and the second output profile according to the multivariate analysis, wherein the preferred output profile comprises changes to output characteristics to compensate for a viewing environment, wherein the preferred output profile comprises audio characteristics comprising one of treble, bass, speaker delay, number of audio channels, or combination thereof, and wherein the preferred profile is specific to the first genre of the media content;
storing, by the system, the preferred output profile at a network server; and
receiving, by the system, a selection of the preferred output profile to compensate for a change in ambient characteristics during presentation of second media content of the first genre via the presentation component.

2. The method of claim 1 wherein the first user experience and the second user experience are generated sequentially.

3. The method of claim 1 wherein the first user experience and the second user experience are generated substantially simultaneously.

4. The method of claim 1 wherein the preferred output profile comprises visual characteristics for the presentation component, wherein the visual characteristics comprise one of contrast, brightness, color, tint, sharpness, color temperature, or a combination thereof.

5. The method of claim 1 wherein the preferred output profile is stored in a set-top box.

6. The method of claim 1 further comprising:
receiving, by the system, a first user score of the first user experience;
receiving, by the system, a second user score of the second user experience; and
analyzing the first user score and the first output profile and the second user score and the second output profile by way of a multivariate analysis, wherein the identifying of the preferred output profile is further performed according to the multivariate analysis.

7. A method comprising:
receiving, by a system comprising a processor, a first version of video data representing media content and a second version of the video data representing the media content, wherein the media content comprises a first genre, wherein the first version is compressed according to a first video compression, wherein the second version is compressed to a second video compression, wherein the first video compression differs from the second video compression, and wherein the media content comprises a first genre;
applying, by the system, a first output profile to the first version of the video data at a first portion of a display during a first reproduction of the media content at the display to generate a first user experience of the media content;
applying, by the system, a second output profile to the second version of the video data at a second portion of the display during a second reproduction of the media content at the display to generate a second user experience, wherein the first user experience and the second experience are simultaneously presented on the first portion and the second portion of the display;
determining, by the system, a preferred output profile between the first output profile and the second output profile according to a multivariate analysis of first preference score of a first user reaction to the first user experience and a second preference score of a second user reaction to the second user experience, wherein the preferred output profile comprises changes to output characteristics to compensate for a viewing environment, wherein the preferred output profile comprises visual characteristics comprising one of contrast, brightness, color, tint, sharpness, color temperature, or a combination thereof, and wherein the preferred profile is specific to the first genre of the media content;

storing, by the system, the preferred output profile; and receiving, by the system, a selection of the preferred output profile to compensate for a change in ambient characteristics during presentation of second media content of the first genre via the display.

8. The method of claim 7 wherein the first user experience and the second user experience are generated sequentially.

9. The method of claim 7 wherein the first user experience and the second user experience are generated substantially simultaneously.

10. The method of claim 7 wherein the preferred output profile is further stored in a set-top box.

11. A set-top box comprising:

a memory to store instructions; and a processor coupled to the memory, wherein the processor, responsive to executing the instructions, performs operations comprising:

receiving a first version of video data representing media content and a second version of the video data representing the media content, wherein the media content comprises a first genre, wherein the first version is compressed according to a first video compression, wherein the second version is compressed to a second video compression that differs from the first video compression, and wherein the media content comprises a first genre;

applying a first output profile to the first version of the video data at a display coupled to the set-top box to generate a first user experience of the media content;

applying a second output profile to the second version of the video data at the display to generate a second user experience of the media content, wherein the first user experience and the second experience are simultaneously presented on a first portion and a second portion of the display;

receiving a first preference score of the first user experience and a second preference score of the second user experiences, wherein a multivariated analysis is performed for the first preference score and the second preference score to identify a preferred output profile comprising visual characteristics consisting of tint, color temperature, and a combination thereof;

storing the preferred output profile at a network server; and receiving a selection of the preferred output profile to compensate for a change in ambient characteristics during presentation of second media content of the genre via the display.

12. The set-top box of claim 11 wherein the first user experience and the second user experience are reproduced at the display sequentially.

13. The set-top box of claim 11 wherein the first user experience and the second user experience are reproduced at the display substantially simultaneously.

14. The set-top box of claim 11 wherein the processor further performs operations comprising:

reproducing audio content according to the first output profile at an audio component to generate a first audio experience;

reproducing audio content according to the second output profile at an audio component to generate a second audio experience;

receiving a user selection of a preference between the first and second audio experiences to identify a preferred audio profile; and storing the preferred audio profile.

* * * * *